UNITED STATES PATENT OFFICE.

GEORGE LIVINGSTONE DODDS, OF WINNIPEG, MANITOBA, CANADA.

SOW-THISTLE FOR CATTLE-FEEDING.

1,174,237.　　Specification of Letters Patent.　　Patented Mar. 7, 1916.

No Drawing.　　Application filed September 27, 1915. Serial No. 52,889.

*To all whom it may concern:*

Be it known that I, GEORGE LIVINGSTONE DODDS, a citizen of the Dominion of Canada, residing at the city of Winnipeg, in the Province of Manitoba and the Dominion of Canada, have invented certain new and useful Improvements in Sow-Thistle for Cattle-Feeding, of which the following is a specification.

My invention relates to the manufacture of a food product from what is commonly known as the "sow thistle," (*Sonchus arvensis*). This plant is now looked upon and treated as a noxious weed and in certain parts of the country has become so much of a pest as to require special legislation to control it. My experiments however, have shown that not only is the plant improperly classed, but that with proper treatment it may be made a valuable food for hogs, cattle and other stock. The plant is high in crude fat and crude protein contents and low in fiber, thus establishing its value as a fat producer and tissue builder, and I have further proven that if the plant is harvested and treated as hereinafter set forth, its food values are retained and in marketable shape.

According to the present improvements I prefer to harvest the plants, roots as well as tops, before the nutriment has all left the roots and the plant has become woody, fibrous and hard, that is to say, at some time after the plant has become well developed but before it has reached the flowering stage. This harvest time, under the conditions now prevailing, would be when the plants are approximately eighty days old, but under conditions of cultivation it is thought that this time might be greatly shortened.

The plants are cut from four to six inches below the surface of the soil, this depending upon the length of time they have been allowed to grow and the consequent root development, the object being to secure as large a proportion of the roots with the plant as possible. After being cut the plant may be allowed to dry in the field till the leaves have become wilted and the stems and roots partially dried, and for ordinary farm purposes the plant at this stage of its treatment, may be used as a cut feed.

At the stage stated the plant will have lost approximately 50% of its inherent moisture but its oily character will still be apparent. I prefer next to gather the plants and subject them to an artificial heat of from 130 to 160 degrees Fahrenheit preferably graduating from the lower to the higher temperature, for a period of several days, or such a time as will be sufficient to cause the fatty contents of the plant to thoroughly permeate the other portions thereof and the whole to become dry and friable. The plants after they have been thus dried are next ground to reduce them to a powder, and the reduced product is preferably sifted to eliminate the woody portions thereof that have not responded to the grinding treatment. By this treatment a food product is produced from an otherwise noxious weed, possessing all the food value and medicinal qualities of first class alfalfa or timothy hay, but in much higher percentages and a much more concentrated form. The resultant product may be returned to its original freshness by the addition of hot water, in which condition it may be fed to poultry, hogs, etc., or it may be mixed with ground grain of different food values to form a balanced ration for stock of all kinds.

It will be understood that the practice of the invention is not to be restricted to the precise treatment herein described, but that it may be varied within the scope of the appended claims without departing from the spirit of the invention.

Having thus fully described my said invention what I claim as new and desire to secure by Letters Patent is:—

1. That food product which consists of sow thistle free from woody fiber dried and ground.

2. That food product which consists of sow thistle dried and ground and free from woody fiber.

3. That food product which consists of the roots and tops of sow thistle free from woody fiber, dried and ground.

4. That improvement which consists in harvesting sow thistle before it has become woody and fibrous then drying and grinding it.

5. That improvement which consists in harvesting sow thistle before reaching the flowering stage, then drying and grinding it.

6. That improvement which consists in harvesting sow thistle roots and tops before they have become woody and fibrous, partially curing them in the field, then subjecting them to artificial heat and grinding them.

7. That improvement which consists in harvesting sow thistle before it has become woody and fibrous, then drying, grinding and sifting it.

8. That improvement which consists in harvesting sow thistle roots and tops, then drying, grinding, and sifting them to remove the fibrous portions.

9. That improvement which consists in harvesting sow thistle roots and tops before they have become woody and fibrous, partially curing them in the field, then subjecting them to artificial heat, then grinding and sifting them.

10. A stock food-product consisting of sow thistle roots and tops, dried ground and sifted.

11. A stock food-product consisting of sow thistle dried, and ground.

12. That improvement which consists in harvesting and drying sow thistle, then reducing it to a fineness adapting it for mixing with other ingredients.

In testimony whereof, I affix my signature in the presence of two witnesses.

GEORGE LIVINGSTONE DODDS.

Witnesses:
G. S. VAN HALLEN,
W. G. CONKLIN.

Copies of this patent may be obtained for five cents each, by addressing the "Commissioner of Patents, Washington, D. C."